June 10, 1924.
J. A. MURPHEY
TILTABLE STEERING WHEEL
Filed July 22, 1922
1,496,861
4 Sheets-Sheet 1
FIG. I
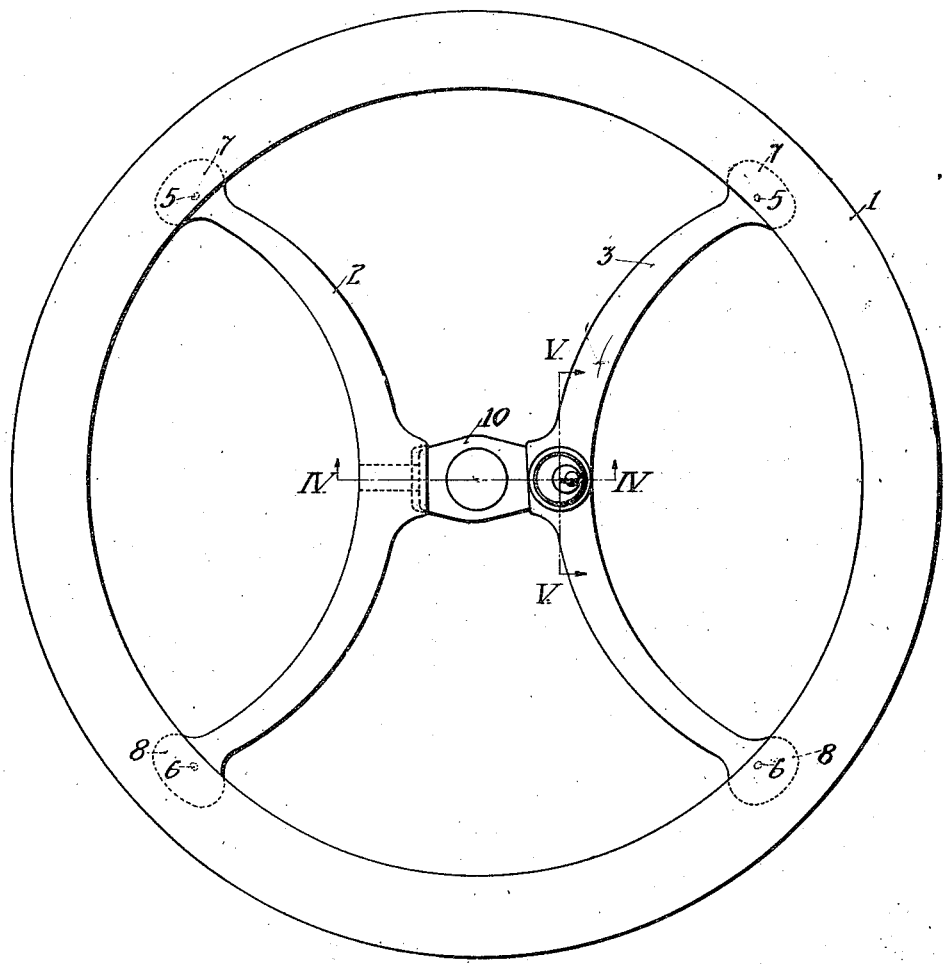
FIG. II
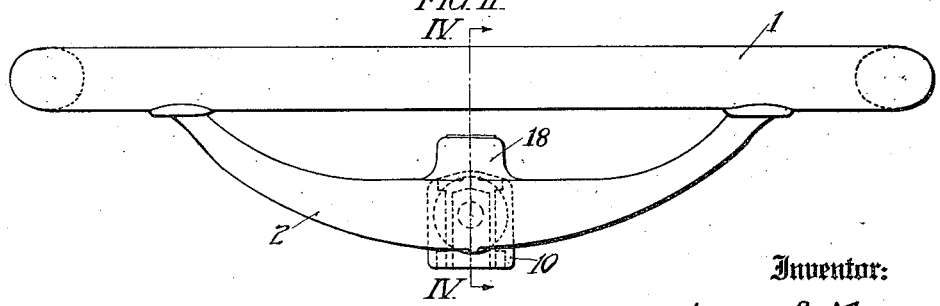
Inventor:
JAMES A. MURPHEY

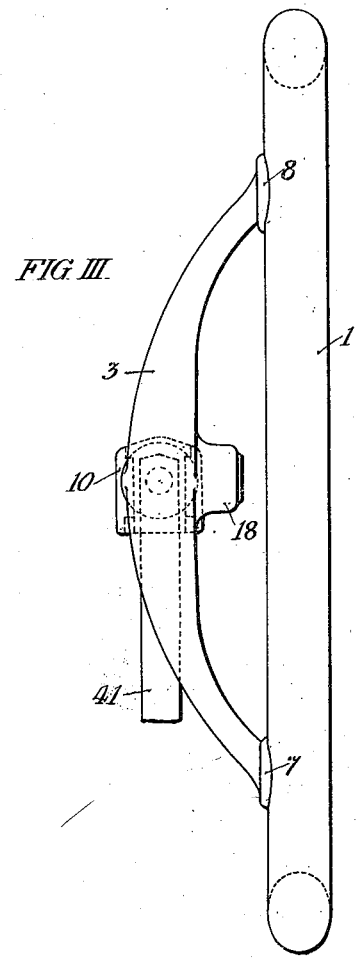
FIG. III.

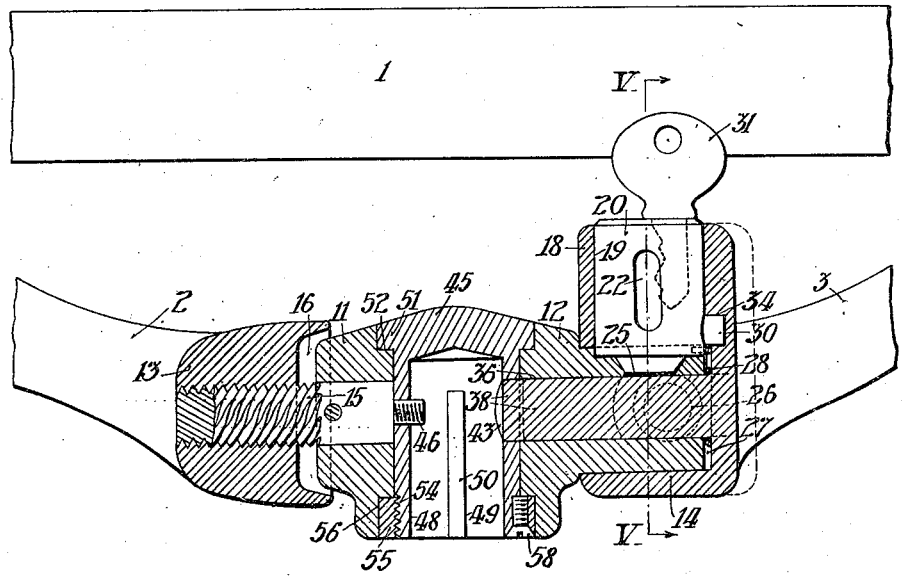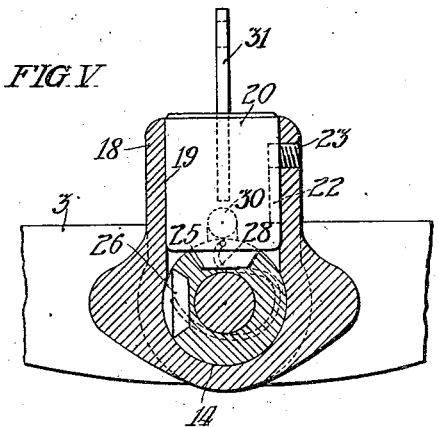

June 10, 1924.
J. A. MURPHEY
1,496,861
TILTABLE STEERING WHEEL
Filed July 22, 1922
4 Sheets-Sheet 4
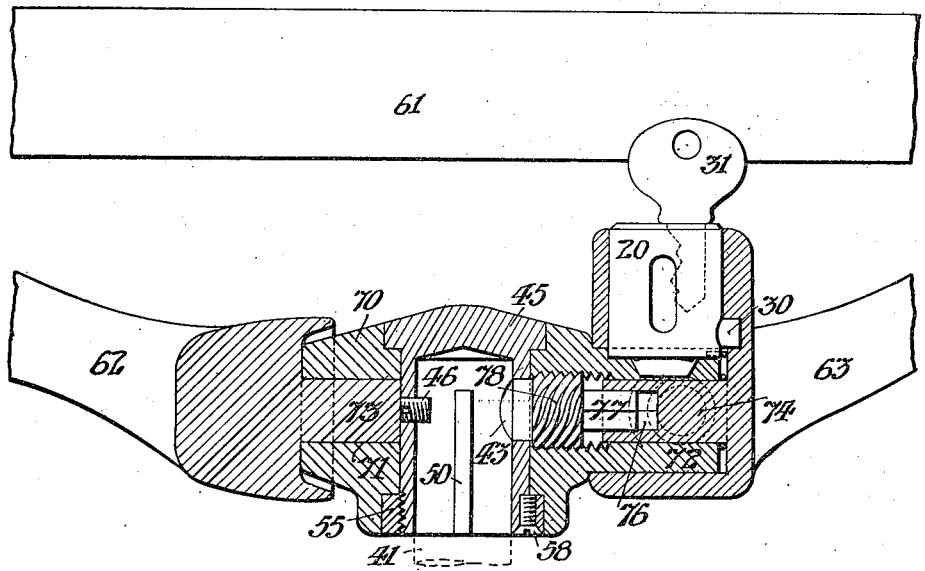
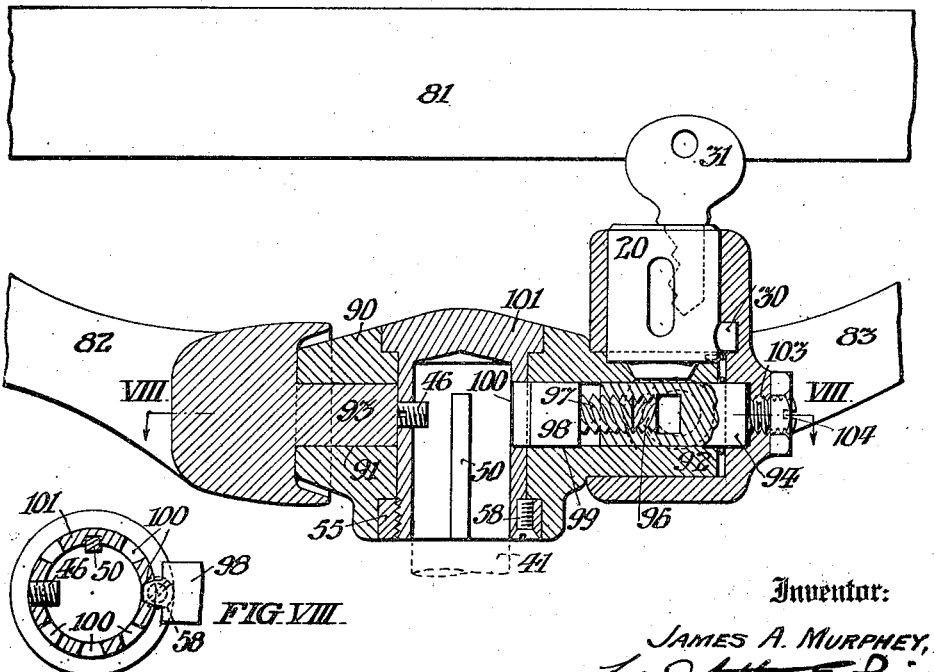
Inventor:
JAMES A. MURPHEY, Patented June 10, 1924.

1,496,861

UNITED STATES PATENT OFFICE.

JAMES A. MURPHEY, OF GERMANTOWN, PENNSYLVANIA.

TILTABLE STEERING WHEEL.

Application filed July 22, 1922. Serial No. 576,684.

*To all whom it may concern:*

Be it known that I, JAMES A. MURPHEY, a citizen of the United States, residing at Germantown, Philadelphia, in the State of Pennsylvania, have invented a certain new and useful Improvement in Tiltable Steering Wheels, whereof the following is a specification, reference being had to the accompanying drawings.

My invention relates to an automobile steering wheel capable of being tilted with respect to the steering shaft upon which it is mounted, so as to facilitate the ingress and egress of the operator with respect to the chauffeur's seat. It is characteristic of the form of my invention hereinafter described; that said wheel is hingedly connected with its hub and provided with locking means to hold the wheel in operative and in tilted, inoperative, position with respect to said hub and the steering shaft; and said wheel is provided with means, operative by the tilting movement thereof, to operatively connect and disconnect said wheel with the steering shaft.

In the forms of my invention hereinafter described; the pivotal connection between the hub and the wheel includes diametrically axially alined pivotal members on the hub, in cooperative relation with pivotal members on brackets carried by the wheel rim; one of said pivotal connections is provided with two sockets which extend radially to the axis upon which the wheel tilts and are in such circumferentially spaced relation as to respectively register with a lock, carried by the wheel; one of said sockets being engaged by said lock when the wheel is in operative position, and the other of said sockets being engaged by said lock when the wheel is tilted to inoperative position. Moreover, a screw threaded locking member, which is in coaxial relation with said axis, is adapted to be relatively moved axially, by the tilting movement of the wheel, so as to cause the steering wheel to be operatively connected with the steering shaft, when in a plane at right angles to said shaft, but when said wheel is tilted to idle position, it is disconnected from the steering shaft, so that said wheel and its hub may spin idly with respect to the steering shaft, although axial displacement of the wheel hub is prevented by its engagement with a sleeve having means to rigidly connect it with the steering shaft, to afford a rotary journal for said hub, when the latter is thus released.

My invention includes the various novel features of construction and arrangement hereinafter more definitely specified.

In said drawings: Fig. I is a plan view of a wheel conveniently embodying my invention, wherein the screw threaded locking member is rigidly connected with the wheel hub.

Fig. II is an elevation of said wheel, as seen from the right-hand side thereof in Fig. I; in operative position.

Fig. III is an elevation similar to Fig. II; but with the wheel tilted to inoperative position.

Fig. IV is a fragmentary vertical sectional view, taken on the line IV, IV in Figs. I and II, but on a larger scale; showing the steering wheel in operative connection with the steering shaft.

Fig. V is a vertical sectional view of the wheel locking mechanism, taken on the line V, V in Figs. I and IV.

Fig. VI is a fragmentary vertical sectional view, similar to Fig. IV, but showing a modified form of my invention, wherein the screw threaded locking member is a distinct entity, capable of relative axial movement with respect to both the wheel and the hub, and turns with the tilting movement of the wheel.

Fig. VII is a fragmentary vertical sectional view, similar to Figs. IV and VI, but showing a modified form of my invention, wherein the screw threaded locking member is a distinct entity, capable of relative axial movement with respect to both the wheel and the hub, but does not turn with the tilting movement of the wheel.

Fig. VIII is a plan sectional view, taken on the line VIII, VIII in Fig. VII, showing only the locking means.

In the form of my invention shown in Figs. I to V inclusive; the steering wheel includes the annular rim 1 which is conveniently formed of wood or a non-metallic composition. The trunnion bearing brackets 2 and 3 are mounted on said rim 1 at diametrically opposite sides thereof and rigidly connected therewith by respective screws 5 and 6 extending through respective flange plates 7 and 8 on said brackets. However, said screws 5 and 6 may be omitted, and the flanges 7 and 8 be imbedded in said rim 1.

The hub 10 includes diametrically opposite axially alined trunnions 11 and 12 which are respectively journaled in the bearings 13 and 14 in the respective brackets 2 and 3. As best shown in Fig. IV; said trunnion 11 is provided with the left-hand screw thread 15 which is in screw threaded engagement with its journal in said bracket 2. Such construction and arrangement permit the wheel to be tilted from the position shown in Figs. I and II to the position shown in Fig. III, with screwing movement of said bracket 2 upon said trunnion 11 to the extent of one quarter of the pitch of said thread 15; thus incidentally shifting said wheel rim 1 eccentrically with respect to the hub, to that extent. Therefore, I allow a corresponding space 16 between the end of the trunnion 11 and its journal 13.

As best shown in Fig. IV; said journal 14 is smoothly cylindrical and capable of the slight axial movement equal to the axial dimension of said space 16; so that said wheel may be readily tilted from the operative position shown in Fig. II to the idle position shown in Fig. III.

As shown in Figs. IV and V; said bracket 3 carries, conveniently in unitary relation therewith, the lock casing 18 having the cylindrical bore 19 extending radially with respect to the axis of said trunnions 11 and 12. The lock body 20 is mounted to reciprocate in said bore 19 of said casing 18 and its reciprocatory movement limited by the slot 22 in said body 20, in cooperation with the set screw 23 which extends through said casing 18 into engagement with said slot. Said trunnion 12 has two cylindrical lock recesses 25 and 26 in its circumference, adapted to receive the inner end of said lock body 20, and respectively in concentric relation with radii extending from the axis of reciprocation of said lock body 20, when the wheel is respectively in operative and inoperative position; so that said lock body may be thrust into either of said recesses 25 and 26 to detain the wheel, in either operative or inoperative position. Said bracket 3 has the recess 27 for the spring 28 which engages said lock body 20 and constantly tends to thrust it into engagement with said trunnion 12; so that, when free to do so, said lock body 20 is automatically thrust into engagement with whichever of said recesses 25 or 26 is presented in registry therewith. However, said lock body 20 contains locking mechanism of the pin tumbler type including the locking plunger 30 which is adapted to be reciprocated radially with respect to the axis of said lock body 20. Said plunger 30 is normally spring-pressed outwardly, but may be retracted by suitable rotation of the key 31. Said lock casing 18 is provided with the plunger recess 34 which said locking plunger 30 is adapted to engage, when said lock body is in locked or unlocked position with respect to said trunnion 12 and the lock recesses 25 and 26 therein.

Said trunnion 12 of the hub 10 has the cylindrical axial bore 36 in which the locking plunger 38 is fitted to slide axially and turn to and from locked position. Although I have shown said plunger 38 as in unitary connection with said bracket 3, it may be a primarily separate piece, pinned or otherwise rigidly secured in said bracket. Therefore, the construction and arrangement are such that when said wheel rim 1 extends in a plane at right angles to the axis of the steering shaft 41; said locking plunger or bolt 38 is thrust inwardly to the position shown in full lines in Fig. IV, but, when said rim is tilted to the inoperative position shown in Fig. III, said plunger 38 is retracted to the position indicated in dotted lines in Fig. IV.

When said locking bolt 38 is thrust inwardly, in the operative position of the steering wheel, said bolt operatively connects said hub 10 with the steering shaft 41, by engagement of its inner end in the recess 43 in the sleeve 45; which sleeve is rigidly connected with said steering shaft 41, conveniently by the set screw 46, which is accessible through such recess 43 when the lock is removed. Said sleeve may have more than one recess 43, if it is desired to lock the wheel on said shaft 41 in different positions.

The bore 48 in said sleeve 45 may be of any suitable size or shape to fit the different commercial sizes of steering shafts 41, so that my improved wheels may be substituted for the ordinary steering wheels with which such shafts are provided, and any suitable means may be employed to rigidly connect such shafts 41 and sleeves 45. For instance, I may provide said sleeve with a key way 49 to fit the key 50 which is set in said shaft 41. The exterior of said sleeve 45 and the journal for the same in said hub 10 are smoothly cylindrical and so large that such sleeves may be provided with bores for any ordinary size or style of steering shafts. In order to prevent accidental or felonious displacement of said hub 10 with respect to said sleeve 45; I find it convenient to provide the upper end of said sleeve with the annular flange 51, which is fitted to rotate in the seat 52 in said hub 10, and to provide the lower end of said sleeve 45 with the screw thread 54 for engagement with the circular nut 55, which, when in the normal position shown in Fig. IV, forms an annular flange on said sleeve 45, which is fitted to rotate in the seat 56 in said hub 10. To prevent accidental or felonious removal of said nut 55, I find it convenient to connect said sleeve 45 with said nut 55 by the screw 58, which thus interlocks them.

It may be observed that the construction above described is such that the steering wheel rim 1 is rigidly connected with said steering shaft 41 when the parts are in the normal position shown in Figs. I, II, IV and V, but that said hub 10 is disengaged from said sleeve 45, by retraction of said lock bolt 38, when said wheel rim 1 is tilted to the inoperative position shown in Fig. III; in which position said wheel and its hub 10 are free to spin idly upon said sleeve, with respect to the steering shaft and without turning movement of the latter.

Although I have shown the lock casing 18 provided with the locking plunger recess 35; so that the lock body 20 may be thereby detained in retracted unlocked position, if it it desired to idly tilt the wheel, back and forth; said recess 35 may be omitted. In the latter case; when the steering wheel is unlocked and tilted to the position shown in Fig. III, it is not only automatically disconnected from the steering mechanism of the vehicle, but automatically locked in tilted inoperative position by the action of said spring 28, so as to be detained in such idle position until unlocked by turning movement of said key 31. When thus unlocked from such idle position, said wheel may be automatically reconnected with the steering mechanism of the vehicle, by tilting movement of the wheel from the position shown in Fig. III to the position shown in Fig. II, and said wheel is thus automatically relocked in such operative position by the action of said spring 28.

Said slot 22 and screw 23 are merely provided to conveniently limit the reciprocatory movement of the lock body 20 and prevent accidental removal thereof, and, of course, other means may be substituted for that purpose, or such means may be entirely omitted. Moreover, although I have found it convenient to show said lock casing 18 with its bore 19 extending vertically above said hub 10, so that the hole for the lock key 31 may be readily seen by the operator; such lock casing may be extended vertically downward from said hub 10 or in any other convenient position.

Referring to the form of my invention shown in Fig. VI; the steering wheel includes the annular rim 61 which is conveniently formed like the rim 1. The pivotal bearing brackets 62 and 63 are mounted on said rim 61 at diametrically opposite sides thereof and rigidly connected therewith, conveniently in the manner above described.

The hub 70 includes diametrically opposite axially alined trunnion bearing members 71 and 72 in which are respectively journaled the trunnions 73 and 74 which project inwardly, in axial alinement, from the respective brackets 62 and 63. Said trunnion 74 has the socket 76, at its inner end, arranged to engage the shank 77 of the screw 78 so as to rotate the latter, although permitting said screw to reciprocate axially, relatively to said trunnion 74. I find it convenient to make both said socket 76 and shank 77 square. However, they may be made of any other suitable shape. The left-hand screw thread on said screw 78 is in threaded engagement with said hub 70; so that, when said wheel 61 is tilted backward upon its trunnions 73 and 74, said screw 78 is retracted from the recess 43 in the sleeve 45; which sleeve is rigidly connected with a steering shaft 41, conveniently by a set screw 46 which is accessible through said recess 43, when the lock 20 is withdrawn from its locked position shown in Fig. VI, as above described with reference to Fig. IV. However, in the normal operative position of said wheel 61, said screw 78 is thrust inwardly to rigidly and operatively connect the steering wheel 61 with its steering shaft. Said sleeve 45 may have more than one recess 43, if it is desired to lock said wheel on said shaft in different positions, as above contemplated. Of course, when said screw 78 is retracted by tilting the wheel 61 to idle inoperative position, said wheel and its hub 70 are free to spin idly upon said sleeve 45 shown in Fig. VI, so as thus render the steering wheel inoperative.

Of course, said screw 78 turns in the recess 43, like the locking bolt 38, so that it is practically necessary to make such recesses circular, to fit the inner end of said screw in any position of its rotation. However, such construction has the disadvantage that only a few such recesses 43 may be provided in the circumference of the sleeves 45, shown respectively in Figs. IV and VI. Therefore, I find it desirable, in some instances, to employ a locking screw element which does not rotate with respect to the steering shaft, so that its inner end may be made narrower, circumferentially with respect to said shaft, to thus adapt it to fit recesses which are narrower than the recess 43 and of which a larger number can be arranged in the circumference of the sleeve; so that, with such construction, the steering wheels may be operatively connected with their respective steering shafts, in a greater number of different positions of rotation. Such construction and arrangement are illustrated in Figs. VII and VIII.

Referring to the form of my invention shown in Fig. VII; the steering wheel includes the annular rim 81 which is conveniently formed like the rim 1. The pivotal bearing brackets 82 and 83 are mounted on said rim at diametrically opposite sides thereof and rigidly connected therewith, conveniently in the manner above described.

The hub 90 includes diametrically opposite axially alined trunnion bearing members 91 and 92 in which are respectively journaled the trunnions 93 and 94, which project inwardly, in axial alinement, from the respective brackets 82 and 83. Said trunnion 94 has the right-hand screw threaded socket 96, at its inner end, arranged to engage the right-hand locking screw 97 so as to axially shift the latter without rotating it, its rotation being prevented by engagement of its shank 98 in the trunnion socket 99. I find it convenient to make both said socket 99 and shank 98 square. However, they may be made of any other suitable shape. The arrangement described is such that, when said wheel 81 is tilted backward upon its trunnions 93 and 94, said screw 97 is retracted from the recess 100 in the sleeve 101; which sleeve is rigidly connected with a steering shaft 41, conveniently by a set screw 46 which is accessible through said recess 100, when the lock 20 is withdrawn from its locked position shown in Fig. VII, as above described with reference to Fig. IV. However, in the normal operation of said wheel 81, said screw 97 is thrust inwardly to rigidly and operatively connect said steering wheel 81 with its steering shaft. Said sleeve 101 may have more than one recess 100, and I find it convenient to shape the inner end of said screw 97 like a gear tooth and to form a circumferential series of such recesses 100 like gear teeth in said sleeve 101. Of course, when said screw 97 is retracted by tilting the wheel 81 to idle inoperative position, said wheel and its hub 90 are free to spin idly upon said sleeve 101, so as to render said steering wheel inoperative.

Said trunnion 94 may be part of the bearing bracket 83; but I prefer to form it as a separate piece, with a screw thread 103 in threaded engagement with said bracket, and provide said trunnion with the screw driver slot 104, so that it may be adjusted, axially, to thus adjust said locking screw 97 to tightly fit said locking recess 100 in said sleeve 101, and thus prevent any lost rotary motion between the steering wheel and its shaft when they are operatively connected in the position shown in Fig. VII. Said trunnion 94 may be rigidly secured in its adjusted position by the nut 106. However, other adjusting means may be employed.

Therefore, it is to be understood that I do not desire to limit myself to the precise details of construction and arrangement herein set forth, as it is obvious that various modifications may be made therein without departing from the essential features of my invention, as defined in the appended claims.

I claim:

1. A vehicle steering wheel comprising a tiltable rim having bearing brackets with axially alined pivot journals therein, in diametrical relation with the steering shaft axis; one of said journals being screw threaded; a hub for said steering wheel, having axially alined trunnions projecting therefrom in diametrical relation with said steering shaft axis, and pivotally engaged with said bearing journals; one of said trunnions having a screw thread in engagement with the corresponding screw thread in its respective journal; the other of said trunnions having two cylindrical lock recesses with axes in different radial planes with respect to the axis of said trunnions, respectively corresponding with the normally operative position and inoperative tilted position of said rim; a lock casing, carried by the bearing bracket local to said trunnion having said lock recesses; a lock body mounted to reciprocate in said lock casing, radially with respect to said trunnion axis; locking mechanism, of the pin tumbler type, in said lock body, including a laterally projecting locking plunger normally spring pressed for engagement with said casing; means limiting the radially reciprocatory movement of said lock body, including a slot in said body and a set screw in said casing engaging said slot; spring means tending to normally thrust said lock body inwardly into locked position with respect to said lock recesses; a lock bolt in coaxial relation with said trunnion, mounted to turn and axially reciprocate in said trunnion local to said casing; said lock bolt having means connecting it to be turned by tilting movement of said casing; a steering shaft sleeve, journaled in said hub, in coaxial relation with said shaft; means arranged to rigidly connect said sleeve with said shaft; means arranged to prevent axial displacement of said sleeve in said hub, including an annular flange at its upper end and an annular nut at its lower end; means detachably locking said nut on said sleeve, including a screw engaging said sleeve and nut; said sleeve having a recess for engagement with said lock bolt; whereby said lock bolt is adapted to engage said sleeve in rigid relation with said hub when said rim extends in a plane at right angles to the steering shaft axis, and said lock bolt is retracted to disengage said hub from said sleeve and permit relative rotary idle movement thereof when said wheel is tilted to inoperative position, and said wheel is arranged to be alternately automatically locked in operative and in inoperative position.

2. A vehicle steering wheel comprising a tiltable rim having bearing brackets with axially alined pivot journals therein; one of said journals being screw threaded; a hub for said steering wheel, having axially alined trunnions projecting therefrom, and pivotally engaged with said bearing journals; one of said trunnions having a screw thread in engagement with the corresponding screw thread in its respective journal; the other of said trunnions having two lock recesses in different radial planes with respect to the axis of said trunnions, respectively corresponding with the normally operative and tilted positions of said rim; a lock casing, carried by the bearing bracket local to said trunnion having said lock recesses; a lock body mounted to reciprocate in said lock casing; locking mechanism in said lock body including a laterally projecting locking plunger normally spring pressed for engagement with said casing; means limiting the reciprocatory movement of said lock body; spring means tending to normally thrust said lock body inwardly into locked position with respect to said lock recesses; a lock bolt in coaxial relation with said trunnion, mounted to turn and axially reciprocate in said trunnion local to said casing; said lock bolt having a screw thread in engagement with said trunnion and having means connecting it to be turned by tilting movement of said casing; a steering shaft sleeve, journaled in said hub, in coaxial relation with said shaft; means arranged to rigidly connect said sleeve with said shaft; means arranged to prevent axial displacement of said sleeve in said hub; said sleeve having a recess for engagement with said lock plunger; whereby said lock bolt is adapted to engage said sleeve in rigid relation with said hub when said rim extends in a plane at right angles to the steering shaft axis, and said lock bolt is retracted to disengage said hub from said sleeve and permit relative rotary idle movement thereof when said wheel is tilted to inoperative position, and said wheel is arranged to be alternately automatically locked in operative and in inoperative position.

3. A vehicle steering wheel comprising a tiltable rim having bearing brackets with axially alined pivot journals therein; one of said journals being screw threaded; a hub for said steering wheel, having axially alined trunnions projecting therefrom, and pivotally engaged with said bearing journals; one of said trunnions having a screw thread in engagement with the corresponding screw thread in its respective journal; the other of said trunnions having two lock recesses in different radial planes with respect to the axis of said trunnions, respectively corresponding with the normally operative and tilted positions of said rim; a lock casing, carried by the bearing bracket local to said trunnion having said lock recesses; a lock body mounted to reciprocate in said lock casing; means limiting the reciprocatory movement of said lock body; a lock bolt mounted to turn and axially reciprocate in said trunnion local to said casing; said lock bolt connected to be turned by tilting movement of said casing; a steering shaft sleeve, journaled in said hub; means arranged to rigidly connect said sleeve with said shaft; means arranged to prevent axial displacement of said sleeve in said hub; said sleeve having a tooth recess for engagement with said lock bolt; whereby said lock bolt is adapted to engage said sleeve in rigid relation with said hub when said rim extends in a plane at right angles to the steering shaft axis, and said lock bolt is retracted to disengage said hub from said sleeve and permit relative rotary idle movement thereof when said wheel is tilted to inoperative position, and said wheel is arranged to be alternately locked in operative and in inoperative position.

4. A vehicle steering wheel comprising a tiltable rim having bearing brackets with axially alined pivot journals therein; one of said journals being screw threaded; a hub for said steering wheel, having axially alined trunnions projecting therefrom and pivotally engaged with said bearing journals; one of said trunnions having a screw thread in engagement with the corresponding screw thread in its respective journal; the other of said trunnions having a lock recess in operative position of said rim; a lock casing, carried by the bearing bracket local to said trunnion having said lock recess; a lock body mounted to reciprocate in said lock casing; means limiting the radially reciprocatory movement of said lock body; a lock bolt mounted to turn and axially reciprocate in said trunnion local to said casing; said lock bolt connected to be turned by tilting movement of said casing; a steering shaft sleeve, journaled in said hub; means arranged to rigidly connect said sleeve with said shaft; means arranged to prevent axial displacement of said sleeve in said hub; said sleeve having a recess for engagement with said lock bolt; whereby said lock bolt is adapted to engage said sleeve in rigid relation with said hub when said rim extends in a plane at right angles to the steering shaft axis, and said lock bolt is retracted to disengage said hub from said sleeve and permit relative rotary idle movement thereof when said wheel is tilted to inoperative position, and said wheel is arranged to be locked in inoperative position.

5. A vehicle steering wheel comprising a tiltable rim having bearing brackets with axially alined pivot journals therein; one of said journals being screw threaded; a hub for said steering wheel, having axially alined trunnions projecting therefrom and pivotally engaged with said bearing journals; one of said trunnions having a screw thread in engagement with the corresponding screw thread in its respective journal; the other of said trunnions having a lock recess corresponding with the inoperative position of said rim; a lock casing, carried by the bearing bracket local to said trunnion having said lock recess; a lock body mounted to reciprocate in said lock casing; a lock bolt mounted to turn and axially reciprocate in said trunnion local to said casing; said lock bolt connected to be turned by tilting movement of said casing; a steering shaft sleeve, journaled in said hub; means arranged to rigidly connect said sleeve with said shaft; means arranged to prevent axial displacement of said sleeve in said hub; said sleeve having a recess for engagement with said lock bolt; whereby said lock bolt is adapted to engage said sleeve in rigid relation with said hub when said rim extends in a plane at right angles to the steering shaft axis, and said lock bolt is retracted to disengage said hub from said sleeve and permit relative rotary idle movement thereof when said wheel is tilted to inoperative position, and said wheel is arranged to be locked in inoperative position.

6. A vehicle steering wheel comprising a tiltable rim having a pivot journal which is screw threaded; a hub for said steering wheel, having a screw trunnion engaged with said journal; said hub having two lock recesses in different radial planes with respect to the axis of said trunnion, respectively corresponding with the normally operative and tilted positions of said rim; a lock casing, carried by said rim; a lock body mounted to reciprocate in said lock casing; a lock bolt in coaxial relation with said trunnion, mounted to turn and axially reciprocate and having means connecting it to be turned by tilting movement of said rim; a steering shaft sleeve, journaled in said hub; means arranged to rigidly connect said sleeve with said shaft; means arranged to prevent axial displacement of said sleeve in said hub; said sleeve having a recess for engagement with said lock bolt; whereby said lock bolt is adapted to engage said sleeve in rigid relation with said hub when said rim extends in a plane at right angles to the steering shaft axis, and said lock bolt is retracted to disengage said hub from said sleeve and permit relative rotary idle movement thereof when said wheel is tilted to inoperative position, and said wheel is arranged to be locked in inoperative position.

7. A vehicle steering wheel comprising a tiltable rim having a pivot journal which is screw threaded; a hub for said steering wheel, having a screw trunnion engaged with said journal; said hub having two lock recesses in different radial planes with respect to the axis of said trunnion, respectively corresponding with the normally operative and tilted positions of said rim; a lock casing, carried by said rim; a lock body mounted to reciprocate in said lock casing; a lock bolt in coaxial relation with said trunnion, mounted to turn and axially reciprocate; and having means connecting it to be turned by tilting movement of said rim; a steering shaft sleeve, journaled in said hub; means arranged to rigidly connect said sleeve with said shaft; said sleeve having a recess for engagement with said lock bolt; whereby said lock bolt is adapted to engage said sleeve in rigid relation with said hub when said rim extends in a plane at right angles to the steering shaft axis, and said lock bolt is retracted to disengage said hub from said sleeve and permit relative rotary idle movement thereof when said wheel is tilted to inoperative position, and said wheel is arranged to be locked in inoperative position.

8. A vehicle steering wheel comprising a tiltable rim and a hub; and screw means pivotally connecting said rim and hub; whereby tilting movement of said rim, in either direction, effects relative rotary and axial movement of said pivot screw and shifts said rim laterally with respect to the axis of said hub; and a lock bolt, carried by said rim, so as to be thrust toward said hub when said rim is tilted to operative position, and retracted from said hub, when said rim is tilted to inoperative position; and means, carried by said hub, arranged to engage said lock bolt, and thereby rigidly connect said rim with said hub, in operative position; and rotatable locking means, carried by said rim, lockable by a removable key to detain said rim in inoperative position, and thus prevent steering operation thereof.

In testimony whereof, I have hereunto signed my name at Philadelphia, Pennsylvania, this 12th day of July, 1922.

JAMES A. MURPHEY.

Witnesses:
ARTHUR E. PAIGE,
CAROLINE E. REUTER.